(12) United States Patent
Dutton et al.

(10) Patent No.: US 6,255,445 B1
(45) Date of Patent: Jul. 3, 2001

(54) POLYMERS HAVING IMPROVED PROCESSABILITY

(75) Inventors: Amanda Jane Dutton, Warrington; Robert Craig Wasson, Wirral, both of (GB); Ivan Lode André Maria Claeys, Zemst (BE)

(73) Assignee: Solvay Interox Limited (GB)

( * ) Notice: Subject to any disclaimer, the term of this patent is extended or adjusted under 35 U.S.C. 154(b) by 0 days.

(21) Appl. No.: 09/029,972

(22) PCT Filed: Sep. 9, 1996

(86) PCT No.: PCT/GB96/02223

§ 371 Date: Apr. 17, 1998

§ 102(e) Date: Apr. 17, 1998

(87) PCT Pub. No.: WO97/10280

PCT Pub. Date: Mar. 20, 1997

(30) Foreign Application Priority Data

Sep. 15, 1995 (GB) .................................. 9518950

(51) Int. Cl.$^7$ .................................. C08G 63/08
(52) U.S. Cl. .................. 528/354; 528/355; 528/495; 528/502 B; 528/503; 264/45.2; 264/45.8; 264/45.9

(58) Field of Search .................. 528/354, 355, 528/495, 502 B, 503; 264/45.2, 45.8, 45.9

(56) References Cited

U.S. PATENT DOCUMENTS 3,169,945 * 2/1965 Hostetler et al. .................. 528/354

FOREIGN PATENT DOCUMENTS 0 003 846    9/1979    (EP) .

* cited by examiner

*Primary Examiner*—Duc Truong
(74) *Attorney, Agent, or Firm*—Larson & Taylor, PLC

(57) ABSTRACT

Poly(lactones) are provided. The poly(lactones) are obtained by polymerization of a lactone with an initiator system comprising at least one polyfunctional initiator. The poly(lactones) have a shear viscosity at some temperature in the range of from 35 to 45° C. above the melting temperature of the poly(lactone) of at least 6 kPas at 0.1 $s^{-1}$ shear rate and no greater than 3.5 kPas at 100 $s^{-1}$ shear rate, and a shear viscosity activation energy of greater than 40 kJ/mol. Preferably, the poly(lactone) is poly(caprolactone).

32 Claims, No Drawings

POLYMERS HAVING IMPROVED PROCESSABILITY

This invention concerns poly(lactones), particularly poly(caprolactones), and more particularly poly(lactones) having improved processability, especially permitting the poly(lactone) to be film-blown.

Poly(lactones) and particularly poly(caprolactones) have a number of desirable properties, including good biodegradability, tensile strength and toughness, and a relatively low melting point. These properties make the use of poly(lactones) particularly desirable in the polymer industry. Many potential applications for poly(lactones) require the poly(lactone) to be in the form of a film. However, poly(lactones) are commonly produced in non-laminar form, for example in block, powder or granular form, amongst others. It is therefore necessary for poly(lactones) to be processed to produce the desired film. One method commonly employed for processing polymers into a film is film-blowing, where a polymer melt is extruded through a circular die, and the resultant tube of extrudate is inflated and cooled by a gas, commonly air, to produce a bubble. The bubble is then flattened to produce a double thickness or tubular film, which may be used as such, or may be cut and opened out to form a single thickness film.

Several methods to produce films comprising a poly(lactone) have been proposed in the art. European patent application no. 0 003 846 discloses that a composition comprising a poly(lactone) that is suitable for film-blowing can be produced if a lactone is polymerised with a polyfunctional acrylate, followed by subsequent cross-linking of the polymer by exposure to radiation. Goldberg et al in a paper entitled "Degradation of Polycaprolactone Films in Soil and Compost Mediums" teach that an 80,000 molecular weight poly(caprolactone) could be film-blown under given conditions. Japanese patent application no. 6-143412 also teaches that linear 80,000 molecular weight poly(caprolactonel could be film-blown using a specifically designed film-blowing process including the use of a water cooling ring appropriately positioned on the bubble. The process is complicated, and requires stringent control of a number of process variables. The process is also restricted to apparatus comprising the water cooling ring, and a blow-up ratio of 1:1.5 to 2. In the course of practical studies leading up to the instant invention, it was found that it was not a simple matter to film-blow linear 80,000 molecular weight poly(caprolactone), and even with strict control of the film-blowing process, good results were difficult to achieve. Attempts to film blow such linear poly(caprolactones) produced an unstable bubble, excessive longitudinal stretching or collapse of the tubular melt at the die and welding together of the film at the nip rollers.

It is an object of one aspect of the present invention to provide poly(lactones) having improved processability and/or which avoid or ameliorate the problems associated with the production of films by film-blowing of prior art poly(lactones).

It is a second object of further aspects of the present invention to provide a process for film-blowing poly(lactones).

According to one aspect of the present invention, there is provided a poly(lactone), characterised in that:
a) the poly(lactone) is initiated with an initiator system comprising at least one polyfunctional initiator,
b) when shear viscosity is measured at some temperature in the range of from 35 to 45° C. above the melting temperature of the poly(lactone), the poly(lactone) has a shear viscosity of at least 6 kPas at $0.1\ s^{-1}$ shear rate and no greater than 3.5 kPas at $100\ s^{-1}$ shear rate, and
c) the poly(lactone) has a shear viscosity activation energy of greater than 40 kJ/mol.

According to a second aspect of the present invention, there is provided a process for film-blowing a poly(lactone), characterised in that:
a) the poly(lactone) that is film-blown is initiated with an initiator system comprising at least one polyfunctional initiator,
b) when shear viscosity is measured at some temperature in the range of from 35 to 45° C. above the melting temperature of the poly(lactone), the poly(lactone) that is film blown has a shear viscosity of at least 6 kPas at $0.1\ s^{-1}$ shear rate and no greater than 3.5 kPas at $100\ s^{-1}$ shear rate, and
c) the poly(lactone) that is film blown has a shear viscosity activation energy of greater than 40 kJ/mol.

According to a third aspect of the present invention, there is provided a polymerisation process for the production of a poly(lactone) by reaction between a lactone and an initiator system, characterised in that:
a) the initiator system comprises at least one polyfunctional initiator, and
b) the reaction is continued until the poly(lactone) produced thereby has a shear viscosity when measured at some temperature in the range of from 35 to 45° C. above the melting temperature of the poly(lactone) of at least 6 kPas at $0.1\ s^{-1}$ shear rate and no greater than 3.5 kPas at $100\ s^{-1}$ 1 shear rate, and a shear viscosity activation energy of greater than 40 kJ/mol.

For the avoidance of doubt, all molecular weights quoted herein are expressed in g/mol, unless otherwise stated.

Poly(lactones) that can be employed in the present invention comprise a backbone having a repeating unit of general chemical formula:

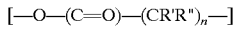

and are commonly derived from the ring opening polymerisation of lactones having the general chemical formula:

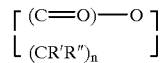

wherein R' and R" are independently hydrogen atoms or alkyl groups having up to 12 carbon atoms and n is from 3 to 7, and preferably n is 5. In many embodiments the total number of carbons in R' and R" is 0 or 1 to 4, and preferably at least one of R' and R" is a hydrogen atom. Particularly preferably, the poly(lactone) is a poly(ε-caprolactone).

The poly(lactones) of the present invention exhibit significant shear thinning properties, ie at low shear rates, they have a viscosity significantly higher than the viscosity at high shear rates. The poly(lactones) are selected to have a viscosity at low shear rates such that when the poly(lactones) are film-blown, the viscosity is high enough to produce a dimensionally stable tubular melt and/or bubble. However, the viscosity is preferably not too high, because the higher processing temperature required for the poly(lactones) can cause excessively delayed solidification of the poly(lactone) in the bubble, thus causing bubble instability and can also cause incomplete solidification of the poly(lactone) at the nip rollers resulting in welds in the interior of the bubble. A high viscosity can also increase the tendency of the poly(lactones) to suffer from melt-fracture, which results in a film having an unacceptable appearance.

The shear viscosity of the poly(lactones) when measured at some temperature in the range of from 35 to 45° C. above the melting temperature of the poly(lactone) at a shear rate of $0.1\ s^{-1}$ (hereinafter called low-shear viscosity) is at least 6 kPas, often at least 8 kPas, and preferably at least 10 kPas. The low-shear viscosity is usually less than 120 kPas, often less than 90 kPas, more often less than 30 kPas, and preferably less than 20 kPas. Particularly preferably, the low-shear viscosity is in the range of from 11 kPas to 18 kPas, especially from 12 kPas to 15 kPas. The poly(lactones) often exhibit the defined low-shear viscosity over at least half, and preferably all, of the temperature range.

The viscosity at high shear rates is preferably not too high, or the power consumption of the extruder may be excessive, and also there may be an unacceptable temperature rise during the extrusion process, although to some extent, these disadvantages can be ameliorated by modifications to the extruder, such as alterations of the screw geometry. The shear viscosity of the poly(lactones) when measured at some temperature in the range of from 35 to 45° C. above the melting temperature of the poly(lactone) at a shear rate of $100\ s^{-1}$ (hereinafter called high-shear viscosity) is not greater than 3.5 kPas, and is preferably no greater than 3 kPas. High-shear viscosities in the range of from 0.5 kPas to 2.5 kPas, especially from 1 kPas to 2 kPas are particularly preferred. The poly(lactones) often exhibit the defined high-shear viscosity over at least half, and preferably all, of the temperature range.

The melting temperature of the poly(lactone) compositions is determined from the maximum of the endothermic peak during differential scanning calorimetry. In many embodiments of the present invention, and particularly when the poly(lactone) composition comprises a poly (caprolactone), the melting temperature is often greater than 45° C., and is preferably about 60° C., such as from 58 to 63° C.

The activation energy of shear viscosity of the poly(lactones) must be greater than 40 kJ/mol, and is preferably in the range of from 42 to 55 kJ/mol. The activation energy can conveniently be measured by time-temperature superposition methods. In such methods, the shear viscosity profile over a range of shear rates is measured at a number of different temperatures, T, preferably at a least 3 temperatures, and then calculating the shift factors, $a_T$, necessary to superimpose the shear rate profiles over that for a reference temperature, $T_0$. Commonly, the reference temperature is chosen to be one of the temperatures at which the shear viscosity profiles are measured. Calculation of the shift factors can be achieved using the methodology described in "Dynamics of Polymeric Fluids, Vol. 1, Fluid Mechanics", page 139, by Bird, Armstrong and Hassager, published by J Wiley & sons, 1987. From the Arrhenius equation:

$$a_T = \exp[\Delta H/R(1/T - 1/T_0)],$$

where $\Delta H$ is the activation energy, R is the gas constant 8.3143 J/mol.K, a linear regression of a plot of $\ln(a_T)$ against $1/T$ gives the activation energy of viscosity.

The poly(lactones) often have a reciprocal melt elasticity, $G''/G'$ of less than 7, commonly less than 6, and preferably from 1 to 3, when measured at some temperature in the range of from 35 to 45° C. above the melting temperature of the poly(lactone) and a shear rate of $1\ s^{-1}$. The poly(lactones) often exhibit the desired reciprocal melt elasticity over at least half, and preferably all, of the temperature range. Melt elasticities of <7 have been found to be favourable for assisting the stability of the blown-film bubble. Poly (lactones) which demonstrate the presence of strain hardening in extensional flows, particularly when measured by transient stress response during isothermal uniaxial extension of cylindrical samples, have been found to be particularly advantageous embodiments of the present invention.

The poly(lactones) according to the present invention are often prepared by ring opening polymerisation of cyclic lactones to produce poly(esters). Ring opening polymerisation of cyclic lactones is initiated by initiators comprising an active hydrogen group, for example —OH, —NH$_2$, =NH, —SH and —CO$_2$H. The functionality of initiators is determined by calculating the number of such active hydrogen groups in the initiator. In the present invention, the polymerisation is initiated by the use of an initiator system which comprises a polyfunctional initiator, ie an initiator that is at least trifunctional. Preferably, tri or tetrafunctional initiators are employed, with trifunctional initiators being particularly preferred. Examples of suitable trifunctional initiators include aromatic and alkyl triols, including particularly 1,1,1-trimethylolpropane. Other trifunctional initiators include alcohol amines, such as 1-, and 2-aminopropanols, 2- and 4-aminobutanols and such like, and particularly triethanolamine. In many embodiments, a preferred trifunctional initiator for obtaining the poly(lactones) according to the present invention comprises a low molecular weight poly(caprolactone) which has itself been initiated by a trifunctional initiator, preferably trimethylolpropane, particularly a poly(caprolactone) having a molecular weight of from 500 to 2,000, and preferably from 700 to 1200. Examples of tetrafunctional initiators include diamines such as ethylene diamine, and similar propane and butane derived diamines. Other tetrafunctional initiators include aromatic and alkyl tetra-ols and particularly pentaerythritol and di(trimethylolpropane). A preferred tetrafunctional initiator for obtaining the poly(lactones) according to the present invention comprises a low molecular weight poly (caprolactone) which has itself been initiated by a tetrafunctional initiator, preferably pentaerythritol, particularly a poly (caprolactone) having a molecular weight of from 500 to 2,000, and preferably from 700 to 1200.

In certain embodiments of the present invention, it has been found to be particularly advantageous to employ a mixture of at least one polyfunctional initiator with at least one mono and/or difunctional initiator. The use of such a mixed initiator system is particularly suited to producing poly(lactones) according to the present invention having lower low-shear viscosities, particularly less than 30 kPas, which are often easier to process. The mole ratio of polyfunctional initiator:mono or difunctional initiator is often selected to be no greater than about 5:1, is often no less than 1:5, and is preferably from 2:1 to 1:2. Examples of mono or di functional initiators that can be employed in these embodiments of the present invention include particularly C6 to C22 alkyl mono-alcohols such as cetyl alcohol, 2-ethylhexanol and lauryl alcohol, and diols such as butane-1,4-diol, neopentlyglycol, diethyleneglycol, 1,6-hexanediol and dimethyldiglycol. Other mono or difunctional initiators that can be employed comprise low molecular weight poly (caprolactones) which have themselves been initiated by a mono- or difunctional initiator, particularly poly (caprolactones) having a molecular weight of from 300 to 1,500, and preferably from 600 to 1000.

A mixture of a polyfunctional initiator with a mono and/or difunctional initiator can be employed in a number of different ways to produce a poly(lactone) according to the present invention. In some embodiments, the mixture of initiators can be present in the selected mole ratio at the start of the addition polymerisation of the lactone. In other embodiments, one of the initiators, preferably the polyfunctional initiator, is present at the start of the polymerisation, with the other initiator being added at some point, or over a period of time, after the polymerisation is underway.

The poly(lactones) according to the present invention can also be prepared by blending a poly(lactone) initiated with at least one polyfunctional initiator with one or more other poly(lactones), preferably initiated with a mono and/or difunctional initiator, to produce a poly(lactone) composition.

When a poly(lactone) according to the present invention is prepared, the reaction between the initiator system and the lactone is continued until a poly(lactone) having the desired properties is produced.

When an initiator system consisting of a single tri or tetrafunctional initiator is employed, the mole ratio of lactone monomer to number of active hydrogens in the initiator is usually selected to be such that the theoretical degree of polymerisation, ie the number of monomer units in the polymer, is at least 650, preferably at least 750, and is usually no greater than 1,500, usually no greater than 1,100, with degrees of polymerisation in the range of from 800 to 950 often being preferred. Commonly, the theoretical molecular weight of polymer, assuming all the monomer reacts with the initiator, is at least 75,000, preferably at least 85,000, and is usually no greater than 170,000, preferably no greater than 130,000, with molecular weights in the range from 90,000 to 110,000 being particularly preferred.

When an initiator system consisting of a mixture of a tri or tetrafunctional initiator with a mono or difunctional initiator is employed, the mole ratio of lactone monomer to total number of active hydrogens in the initiator system, assuming all the monomer reacts with the initiator, and that each of the active hydrogens is equally reactive is usually selected to be such that the theoretical degree of polymerisation is the number of monomer units per active hydrogen is at least 220, preferably at least 260, and is often no greater than 520, usually no greater than 440. Commonly, the theoretical molecular weight of polymer per active hydrogen is at least 25,000, preferably al least 30,000, and is often no greater than 60,000, usually no greater than 50,000. In practice, the reactivities of the active hydrogens in polyfunctional initiators are rarely equivalent in reactivity to the active hydrogens in a mono or di functional initiator. However, it is believed that when polyfunctional initiators comprising low molecular weight poly(lactones) which have themselves been initiated with a polyfunctional initiator are employed in combination with a mono or difunctional initiator, the reactivities of the active hydrogens are much closer to being equivalent. Without wishing to be bound by any theory, it is believed that it is for this reason that the use of such low molecular weight poly(lactones) gives such advantageous results in combination with a mono or di functional initiator.

According to one preferred aspect of the present invention, there is provided a poly(caprolactone) suitable for film blowing, characterised in that the poly(caprolactone) is initiated with an initiator system comprising:
a) a poly(caprolactone) having a molecular weight of from 500 to 2,000 which has been initiated itself by trimethylolpropane or pentaerythritol, and
b) a mono or difunctional initiator selected from the group consisting of cetyl alcohol and butane-1,4-diol, the poly(caprolactone) has a shear viscosity at 100° C. of from 10 kPas to 20 kPas at 0.1 s$^{-1}$ shear rate and from 1 kPas to 2 kPas at 100 s$^{-1}$ shear rate, and an activation energy of greater than 40 kJ/mol.

The polymerisation process according to the present invention is usually carried out a reaction temperature of greater than 100° C., and often greater than 130° C. The temperature is usually less than 200° C., with a temperature in the range of from 160° to 180° C. being preferred. The reaction is usually continued until the reaction is substantially complete. Completion of the reaction is usually detected by the absence of condensing monomer fumes and/or a substantial increase in the torque required to stir the reaction mixture. Reaction times are typically in the region of several hours, Such as about 4 hours to about 12 hours, although longer or shorter reaction times can be employed if desired. The polymerisation reaction can take place under an air atmosphere, but in many embodiments, an inert atmosphere, commonly a nitrogen atmosphere, is employed. The reaction can take place in the presence of an organic solvent, but the presence of a solvent is not essential, and therefore it is preferred not to employ such a solvent.

The ring opening polymerisation of lactones is conventionally carried out in the presence of a catalyst. Suitable catalysts are well known in the art, and include for example, those disclosed for that purpose in "Kinetics and Mechanisms of Polymerisation", Volume 2, pages 266 to 268, Edited by Frisch and Reegen, and published by Marcel Dekker, incorporated herein by reference. A particularly preferred catalyst comprises stannous octoate, commonly employed at a concentration of from 10 to 150 ppm.

According to a second preferred aspect of the present invention, there is provided a process for the production of a poly(caprolactone) by reaction between caprolactone and an initiator system, characterised in that the initiator system comprises:
a) a poly(caprolactone) having a molecular weight of from 500 to 2,000 which has been initiated itself by trimethylolpropane or pentaerythritol, and
b) a mono or difunctional initiator selected from the group consisting of cetyl alcohol and butane-1,4-diol, and the reaction is continued until the poly(caprolactone) has a shear viscosity at 100° C. of from 10 kPas to 20 kPas at 0.1 s$^{-1}$ shear rate and from 1 kPas to 2 kPas at 100 s$^{-1}$ shear rate, and an activation energy of greater than 40 kJ/mol.

The poly(lactones) according to the present invention can additionally comprise additives such as stabilisers, nucleating agents, lubricants, anti-block agents, antistatic agents and/or colouring agents. Such additives are typically present at a concentration of no more than 10% w/w. Additional additives that may be employed comprise organic or inorganic fillers, such as cellulosic fibres, micronised scraps of recycled polymer, oxides of magnesium, aluminium, silicon and titanium, calcium carbonate, chalk, talk and such like. Further additives include other polymers, particularly starches.

In addition to having improved film-blowing properties, the poly(lactones) according to the present invention are believed to be suited to other applications in which strain hardening properties are desirable, for example in extrusion blow moulding, laminating e.g. onto paper or cardboard, and thermoforming. They may also find application in areas where strain hardening is less important, for example in extruding cast films and in injection moulding.

The film-blowing process according to the present invention is carried out by film-blowing a poly(lactone) as described hereinabove. The poly(lactone) can be heated in an extruder until it becomes extrudable, or can be supplied to the extruder in ready-extrudable form, and is then extruded through an annular die to form a tube of molten polymer, which is then inflated to produce a bubble. The bubble is cooled, or is allowed to cool, and the solidified bubble collected. The process is carried out employing apparatus that is conventionally employed for film-blowing polymeric materials. Apparatus in which the film is blown to produce a bubble either above or below the extruder can be employed. Typically, granular poly(lactone) is heated in an extruder until it becomes extrudable. The temperature of the poly(lactone) in the extruder is often in the range of from 15° C. to 90° C. above the melting temperature of the poly (lactone), and preferably from 25° C. to 70° C. above the melting temperature of the poly(lactone). The poly(lactone) is extruded through an annular die to form a tube. Typically, the temperature of the poly(lactone) at the die is in the range of from 10° C. to 70° C. above the melting temperature of the poly(lactone), and preferably from 25° C. to 50° C. above the melting temperature of the poly(lactone). In film-blowing, a supply of gas, usually air, is supplied to the centre of the die, and this is employed to blow the extruded poly(lactone) into an inflated bubble. Cooling gas, again commonly air, is also often directed outside the bubble. The cooling effect of the gases causes the poly(lactone) bubble to solidify. The point on the bubble at which solidification commences is known as the frost line. The region between the annular die and the frost line is known as the melt zone, and that between the frost line and the nip rollers as the solid zone. Beyond the frost line, the bubble is collected, often by the use of a pair of nip rollers. The bubble can be guided into these nip rollers by a series of guide rollers. The separation distance of the frost line from the die, and hence the extent of the melt zone, and also the extent of the solid zone, can vary significantly depending, for example, on the film-blowing apparatus being employed, the rates of extrusion, the poly(lactone) being blown and the temperature at the die. Typically, the separation of the frost line from the die will be from about 1×the diameter of the die to about 15×the diameter of the die, and preferably from about 5×the diameter of the die to about 7×the diameter of the die. Blow up ratios (ie the lay-flat width of the film produced divided by the circumference of the die in the region of from 2 to 4.2 can be employed. Draw ratios (ie the linear speed of film at the nip rollers divided by the axial viscosity of extrudate at the die) range from 2 to 7, although higher draw ratios can be employed at low blow up ratios.

According to a third preferred aspect of the present invention, there is provided a process for film-blowing a poly(caprolactone), characterised in that the poly (caprolactone) that is film-blown is initiated with an initiator system comprising:

a) a poly(caprolactone) having a molecular weight of from 500 to 2,000 which has been initiated itself by trimethylolpropane or pentaerythritol, and b) a mono or difunctional initiator selected from the group consisting of cetyl alcohol and butane-1,4-diol, the poly(caprolactone) has a shear viscosity at 100° C. of from 10 kPas to 20 kPas at 0.1 $s^{-1}$ shear rate and from 1 kPas to 2 kPas at 100 $s^{-1}$ shear rate, and an activation energy of greater than 40 kJ/mol.

Having described the invention in general terms, specific embodiments thereof are described in greater detail by way of example only.

General Method for Pilot Plant Scale Preparation of Poly (caprolactone)

This method was employed in Examples 1 to 3 below. To a 50 liter Autoclave reactor fitted with a mechanical stirrer, nitrogen inlet and thermocouple thermometer and connected to a vacuum pump, was charged the desired quantities of caprolactone monomer and initiator system. The reactor contents were heated to 80° C. with stirring. Nitrogen was sparged into the space above the reaction mixture, and reduced pressure applied. The reaction mixture was maintained under these conditions for 1 to 1.5 hours to remove volatile impurities and water, after which the pressure was returned to atmospheric pressure by regulation of the nitrogen flow. The reaction mixture was heated to 110 to 120° C. The desired amount of stannous octoate catalyst was added to the reaction mixture in the form of a solution in caprolactone monomer, and the reaction mixture heated to the reaction temperature(s). The reaction mixture was then maintained under these conditions for the desired reaction time, ie generally until the desired viscosities and activation energies were achieved. After completion of the desired reaction time, the reaction mixture was extruded into a clean collection vessel and allowed to cool to ambient temperature.

General Method for Lab Scale Preparation of Poly (caorolactone)

This method was employed in Examples 4 to 11 below, except as noted. To an appropriately sized flange reactor fitted with a helical stirrer, nitrogen inlet and thermocouple thermometer and connected to a vacuum pump, were charged the desired quantities of caprodactone monomer and initiator system. The reactor contents were heated to 80° C. with stirring. Nitrogen was sparged into the space above the reaction mixture, and reduced pressure applied. The reaction mixture was maintained under these conditions for 1 to 2 hours to remove volatile impurities and water, after which the pressure was returned to atmospheric pressure by regulation of the nitrogen flow. The connection to the vacuum pump was replaced with an air condenser, and the reaction mixture was heated to 120° C. 80 ppm of stannous octoate catalyst was added to the reaction mixture in the form of a 4% w/w solution in toluene, and the reaction mixture heated to 170° C. The reaction mixture was then maintained under these conditions for the desired reaction time, ie generally until the desired viscosities and activation energies were achieved. After completion of the desired reaction time, the stirrer was stopped and the reaction mixture allowed to cool. Whilst the reaction mixture was still pourable, it was poured into a clean mould and allowed to cool to ambient temperature.

Measurement of Shear Viscosity

The shear viscosity of poly(caprolactone) samples was measured u sing a Rheometrics Dynamical Spectrometer at 100° C. in oscillatory shear using a plate-plate geometry. Both the in-phase and the out-of-phase components of the torque response were measured at a variety of shear rates including 0.1 $s^{-1}$ and 100 $s^{-1}$. The viscosities and the reciprocal melt elasticity G"/G' were calculated by the use of computer software provided by Rheometrics with the spectrometer. Plates of 50 mm diameter were employed, with strain chosen to be in the linear viscoelastic region.

Prior to measuring the viscosity, circular 50 mm diameter samples were pressed from a 2 mm thick slab prepared in the following way. Granules or chunks of the poly (caprolactone) sample were placed in a mould at 90° C. for 2 minutes, and then subjected, in a press, to a pressure of 7.6 MPa for 3 minutes. The moulds were then transferred to a second press at 20° C. and allowed to cool to room temperature.

Measurement of Activation Energy

The activation energy of shear viscosity was calculated by measuring the shear viscosity over a range of shear rate values from $0.1\ s^{-1}$ to $100\ s^{-1}$ at three temperatures, T, 70° C., 100° C. and 150° C. This produces three shear viscosity curves, one for each temperature. The shift factors, $a_T$, needed to superimpose each curve on a viscosity curve measured at reference temperature 70° C., $T_0$, are calculated using Rhecalc™ software supplied by Rheometrics. From the Arrhenius equation:

$$a_T = \exp[\Delta H/R(1/T - 1/T_0)],$$

where $\Delta H$ is the activation energy, R is the gas constant 8.3143 J/mol.K, a linear regression of a plot of $\ln(a_T)$ against 1/T gives the activation energy of viscosity.

Film-Blowing Process

The film blowing process employed an extruder available under the Trademark "Dolci 20" having an outer screw diameter of 20 mm, a length of 482 mm, an initial flight depth of 3.5 mm and a compression ratio of 1.75. Compression is progressive. A screen pack made up of 3 layers with a central screen of 80 mesh was employed. A star-fed annular die having an outer diameter of 30 mm and a core of 28.5 mm (ie a gap width of 0.75 mm) were employed. A spiral mandrel was employed to homogenise the flow of material. Air at ambient temperature (from 16 to 28° C.) for external cooling was distributed evenly by means of a cooling ring located about 40 mm above the die. Rubber nip rollers were placed 80 cm above the die, with a collapsing frame to guide the film onto the nip rollers. The poly (caprolactone) in the extruder was heated to a temperature between 90 and 130° C., and extruded at a flow rate of from 2 to 3 m/minute of film, using a screw speed in the range of from 40 to 80 rpm.

EXAMPLE 1

In this example, a pilot plant scale batch of poly (caprolactone) was prepared by employing the general method given above. 19.8 Kg caprolactone monomer was charged to the autoclave reactor and heated to 100° C. The initiator system comprising 11.2 g butane-1,2-diol and 124.4 g of a 1000 molecular weight poly(caprolactone) initiated with pentaerythritol commercially available in the UK under the Registered Trademark "CAPA" 316 from Solvay Interox Limited was then charged to the reactor, the reactor cooled to 80° C. and vacuum sparged under nitrogen. The reaction mixture was then heated to 120° C. and 1.6 g stannous octoate catalyst dissolved in 10 mls caprolactone monomer added, to give a catalyst concentration of 80 ppm. The reaction mixture was then heated to 170° C. for 2 hours. During this time, an exotherm to 206° C. occurred, which was controlled by application of cooling air to the reactor. At the end of the 2 hours, the reaction mixture was extruded.

The product obtained had a low-shear viscosity of 26.5 kPas and a high-shear viscosity of 2.4 kPas. The activation energy of shear viscosity was calculated to be 42 KJ/Mol.

EXAMPLE 2

In this example, a pilot plant scale batch of poly (caprolactone) was prepared by employing the general method given above. 21.37 Kg caprolactone monomer and an initiator system comprising 32.64 g cetyl alcohol (dissolved in warm caprolactone monomer) and 134.6 g of a 1000 molecular weight poly(caprolactone) initiated with pentaerythritol commercially available in the UK under the Registered Trademark "CAPA" 316 from Solvay Interox Limited was charged to the autoclave reactor and heated to 80° C. The reactor was then vacuum sparged under nitrogen. The reaction mixture was then heated to 110° C. and 1.3 g stannous octoate catalyst dissolved in 10 mls caprolactone monomer added, to give a catalyst concentration of 60 ppm. The reaction mixture was next heated to 140° C. for 2 hours, then increased to 160° C. for 20 minutes, and finally to 170° C. for 4.75 hours. Further additions of an additional 10 ppm catalyst were made when the reaction mixture temperature had reached 170° C., and then after 1.5 hours at 170° C. At the end of the 4.75 hours, the reaction mixture was extruded.

The product obtained had a low-shear viscosity of 38 kPas and a high-shear viscosity of 2.35 kPas. The activation energy of shear viscosity was calculated to be 42 KJ/Mol.

EXAMPLE 3

In this example, a pilot plant scale batch of poly (caprolactone) was prepared by employing the general method given above. 22.9 Kg caprolactone monomer and an initiator system comprising 34.7 g cetyl alcohol (dissolved in warm caprolactone monomer) and 128.8 g of a 900 molecular weight poly(caprolactone) initiated with trimethylolpropane commercially available in the UK under the Registered Trademark "CAPA" 310 from Solvay Interox Limited was charged to the autoclave reactor and heated to 80° C. The reactor was then vacuum sparged under nitrogen. The reaction mixture was then heated to 110° C. and 1.85 g stannous octoate catalyst dissolved in 10 mls caprolactone monomer added, to give a catalyst concentration of 80 ppm. The reaction mixture was then heated to 140° C. for 45 minutes, then to 160–170° C. for 2.5 hours. At the end of the 2.5 hours, the reaction mixture was extruded.

The product obtained had a low-shear viscosity of 63 kPas and a high-shear viscosity of 2.9 kPas. The activation energy of shear viscosity was calculated to be 42 KJ/Mol.

Extrusion Trials

Samples of the poly(caprolactones) produced in Examples 1 to 3 were film blown following the general method given above, employing the Dolci 20 extruder. By way of Comparison, attempts were also made to film-blow samples of a 50,000 and an 80,000 molecular weight poly (caprolactone) initiated by 1,4-butanediol commercially available in the UK under the Registered Trademarks "CAPA" 650 and "CAPA" 680 respectively. "CAPA 650" had a low-shear viscosity of 1.5 kPas, a high shear viscosity of 0.9 kPas and an activation energy of shear viscosity of 36 kJ/mol. CAPA 680 had a low-shear viscosity of 8.6 kPas, a high-shear viscosity of 2.1 kPas and an activation energy of shear viscosity of 34 kJ/mol.

During the trials it was observed that the poly (caprolactones) of Examples 1 to 3 could readily be film-blown, producing dimensionally stable bubbles. However, both CAPA 650 and CAPA 680 could not easily be blown, because they produced unstable bubbles.

EXAMPLE 4

A lab scale batch of poly(caprolactone) was produced following the general method, and employing 499.2 g caprolactone monomer and 0.75 g trimethylolpropane initiator. The reaction time was approximately 7 hours.

The poly(caprolactone) produced had a low-shear viscosity of 12 kPas and a high-shear viscosity of 2 kPas. The activation energy of shear viscosity was calculated to be 44 kJ/Mol. The reciprocal melt elasticity G"/G' at $1\ s^{-1}$ was 4.0.

EXAMPLE 5

A lab scale batch of poly(caprolactone) was produced following the general method, and employing 499.3 g caprolactone monomer and 0.67 g trimethylolpropane initiator. The reaction time was approximately 14 hours.

The poly(caprolactone) produced had a low-shear viscosity of 13 kPas and a high-shear viscosity of 1.8 kPas. The activation energy of shear viscosity was calculated to be 43 kJ/Mol. The reciprocal melt elasticity G"/G' at 1 s$^{-1}$ was 3.5.

EXAMPLE 6

A lab scale batch of poly(caprolactone) was produced following the general method, and employing 499.4 g caprolactone monomer and 0.56 g trimethylolpropane initiator. The reaction time was approximately 7 hours.

The poly(caprolactone) produced had a low-shear viscosity of 85 kPas and a high-shear viscosity of 3 kPas. The activation energy of shear viscosity was calculated to be 50 kJ/Mol. The reciprocal melt elasticity G"/G' at 1 s$^{-1}$ was 1.3.

EXAMPLE 7

A lab scale batch of poly(caprolactone) was produced following the general method, except that 120 ppm catalyst, and employing 599 g caprolactone monomer and 1.02 g pentaerythritol initiator. The reaction time was approximately 7 hours. The reciprocal melt elasticity G"/G' at 1 s$^{-1}$ was 6.7.

The poly(caprolactone) produced had a low-shear viscosity of 7 kPas and a high-shear viscosity of 1.5 kPas. The activation energy of shear viscosity was calculated to be 48 kJ/Mol.

EXAMPLE 8

A lab scale batch of poly(caprolactone) was produced following the general method, and employing 499.4 g caprolactone monomer and 0.57 g pentaerythritol initiator. The reaction time was approximately 7 hours.

The poly(caprolactone) produced had a low-shear viscosity of 100 kPas and a high-shear viscosity of 3 kPas. The activation energy of shear viscosity was calculated to be 46 kJ/Mol. The reciprocal melt elasticity G"/G' at 1 s$^{-1}$ was 1.3.

EXAMPLE 9

A lab scale batch of poly(caprolactone) was produced following the general method, and employing 496.9 g caprolactone monomer and an initiator system comprising 0.28 g 1,4-butanediol and 2.81 g of a 900 molecular weight poly(caprolactone) initiated by trimethylolpropane, commercially available in the UK from Solvay Interox Limited under the Registered Trademark "CAPA 310". The reaction time was approximately 8 hours.

The poly(caprolactone) produced had a low-shear viscosity of 15 kPas and a high-shear viscosity of 2.2 kPas. The activation energy of shear viscosity was calculated to be 41 kJ/Mol. The reciprocal melt elasticity G"/G' at 1 s$^{-1}$ was 3.7.

EXAMPLE 10

A lab scale batch of poly(caprolactone) was produced following the general method, and employing 498.8 g caprolactone monomer and an initiator system comprising 0.76 g cetyl alcohol and 0.43 g of pentaerythritol. The reaction time was approximately 9 hours.

The poly(caprolactone) produced had a low-shear viscosity of 22 kPas and a high-shear viscosity of 1.8 kPas. The activation energy of shear viscosity was calculated to be 41 KJ/Mol. The reciprocal melt elasticity G"/G' at 1 s$^{-1}$ was 2.3.

EXAMPLE 11

A lab scale batch of poly(caprolactone) C was produced by blending 38% w/w of a poly(caprolactone) A with 62% w/w of a poly(caprolactone) B. Poly(caprolactone) A was produced by the general method above, employing 596.4 g caprolactone monomer and 3.64 g cetyl alcohol initiator, with a reaction time of 4 days. Poly(caprolactone) B was produced by the general method above, employing 599.3 g caprolactone monomer and 0.67 g trimethylolpropane initiator, with a reaction time of 7 hours. The poly(lactones) were blended for 6 minutes in a laboratory scale roller mixer (available under the Trade name Brabender W50), with the mixing chamber heated to 70° C. prior to the addition of poly(caprolactones) A and B. 0.1 MPa pressure was applied using a ram. The slower roller moved at 50 rpm, the faster at 75 rpm. After completion of the blending operation, poly(caprolactone) C was removed from the mixer and allowed to cool to room temperature.

The poly(caprolactone) C produced had a low-shear viscosity of 8.5 kPas and a high-shear viscosity of 1.6 kPas. The activation energy of shear viscosity was calculated to be 41 KJ/Mol. The reciprocal melt elasticity G"/G' at 1 s$^{-1}$ was 3.8.

What is claimed is:

1. A process for film-blowing a poly(lactone), comprising:
   (a) providing a poly(lactone) having non-linear polymer chains, said poly(lactone) being formed by reaction between a lactone monomer and an initiator system comprising at least one polyfunctional initiator having at least three active hydrogens, the amount of said initiator being such that the theoretical molecular weight, per active hydrogen, of the poly(lactone) polymer chains formed by reaction with said initiator is at least 25,000, having a melting temperature of greater than 45° C., having a shear viscosity, when measured at some temperature in the range of from 35 to 45° C. above the melting temperature of the poly(lactone), of at least 6 kPas at 0.1 s$^{-1}$ shear rate and not greater than 3.5 kPas at 100 s$^{-1}$ shear rate, and having a shear viscosity activation energy of greater than 40 kJ/mol;
   (b) extruding said poly(lactone) through an annular die to form a tube of molten polymer;
   (c) inflating said tube to produce a bubble; and
   (d) cooling the bubble or allowing the bubble to cool to solidify the polymer.

2. A polymerization process for the production of a poly(lactone) having non-linear polymer chains which comprises:
   (a) reacting a lactone monomer with an initiator system, said initiator system comprising at least one polyfunctional initiator having at least three active hydrogens, the amount of said initiator system being such that the theoretical molecular weight, per active hydrogen, of the poly(lactone) polymer chains formed by reaction with said initiator is at least 25,000, said reaction being carried out under an air or inert atmosphere in the presence of a catalyst; and
   continuing the reaction until the reaction is substantially complete and until the poly(lactone) produced has a melting temperature of greater than 45° C., a shear viscosity when measured at some temperature in the range of 35 to 45° C. above the melting temperature of the poly(lactone) of at least 6 kPas at 0.1 s$^{-1}$ shear rate and not greater than 3.5 kPas at 100 s$^{-1}$ shear rate, and a shear viscosity activation energy of greater than 40 kJ/mol.

3. A process of film-blowing according to claim 1, characterized in that the poly(lactone) comprises a poly(ε-caprolactone).

4. A process of film-blowing according to claim 1 or 3, characterized in that the low-shear viscosity is in the range of from 11 kPas to 18 kPas.

5. A process of film-blowing according to claim 4, characterized in that the high-shear viscosity is in the range of from 0.5 kPas to 2.5 kPas.

6. A process of film-blowing according to claim 1 or 3, characterized in that the shear viscosity activation energy is in the range of from 42 to 55 kJ/mol.

7. A process of film-blowing according to claim 1 or 3, characterized in that the poly(lactone) has a reciprocal melt elasticity, G"/G', at some temperature in the range of from 35 to 45° C. above the melting temperature of the poly(lactone), at a shear rate of $1\ s^{-1}$, of less than 7.

8. A process of film-blowing according to claim 1 or 3, characterized in that the initiator system comprises a tri or tetrafunctional initiator.

9. A process of film-blowing according to claim 8, characterized in that the mole ratio of lactone monomer to number of active hydrogens in the initiator is selected to be such that the theoretical molecular weight of polymer, assuming all the monomer reacts with the initiator, is at least 75,000.

10. A process of film-blowing according to claim 9, characterized in that the mole ratio of lactone monomer to number of active hydrogens in the initiator is selected to be such that the theoretical molecular weight of polymer, assuming all the monomer reacts with the initiator, is in the range of 90,000 to 110,000.

11. A process of film-blowing according to claim 1 or 3, characterized in that the initiator system comprises a mixture of at least one polyfunctional initiator with at least one mono or difunctional initiator.

12. A process of film-blowing according to claim 11 characterized in that the mole ratio of polyfunctional initiator: mono or difunctional initiator is from 5:1 to 1:5.

13. A process of film-blowing according to claim 12, characterized in that the mono or difunctional initiator is selected from the group consisting of cetyl alcohol and butane-1,2-diol.

14. A process of film-blowing according to claim 1 or 3, characterized in that the polyfunctional initiator is selected from the group consisting of trimethylolpropane, pentaerythritol, poly(caprolactone) having a molecular weight of from 500 to 2,000 which has itself been initiated with trimethylolpropane, and a poly(caprolactone) having a molecular weight of from 500 to 2,000 which has itself been initiated with pentaerythritol.

15. A polymerization process according to claim 2, characterized in that the poly(lactone) is a poly(ε-caprolactone).

16. A polymerization process according to claim 2 or 15, characterized in that the low-shear viscosity is in the range of from 11 kPas to 18 kPas.

17. A polymerization process according to claim 16, characterized in that the high-shear viscosity is in the range of from 0.5 kPas to 2.5 kPas.

18. A polymerization process according to claim 2 or 15, characterized in that the shear viscosity activation energy is in the range of from 42 to 55 kJ/mol.

19. A polymerization process according to claim 2 or 15, characterized in that the poly(lactone) has a reciprocal melt elasticity, G"/G', at some temperature in the range of from 35 to 45° C. above the melting temperature of the poly(lactone), at a shear rate of $1\ s^{-1}$, of less than 7.

20. A polymerization process according to claim 2 or 15, characterized in that the initiator system comprises a tri or tetrafunctional initiator.

21. A polymerization process according to claim 20, characterized in that the mole ratio of lactone monomer to number of active hydrogens in the initiator is selected to be such that the theoretical molecular weight of polymer, assuming all the monomer reacts with the initiator, is at least 75,000.

22. A polymerization process according to claim 21, characterized in that the mole ratio of lactone monomer to number of active hydrogens in the initiator is selected to be such that the theoretical molecular weight of polymer, assuming all the monomer reacts with the initiator, is in the range from 90,000 to 110,000.

23. A polymerization process according to claim 2 or 15, characterized in that the initiator system comprises a mixture of at least one polyfunctional initiator with at least one mono or difunctional initiator.

24. A polymerization process according to claim 23, characterized in that the mole ratio of polyfunctional initiator: mono or difunctional initiator is from 5:1 to 1:5.

25. A polymerization process according to claim 24, characterized in that the mono or difunctional initiator is selected from the group consisting of cetyl alcohol and butane-1,2-diol.

26. A polymerization process according to claim 2 or 15, characterized in that the polyfunctional initiator is selected from the group consisting of trimethylolpropane, pentaerythritol, poly(caprolactone) having a molecular weight of from 500 to 2,000 which has itself been initiated with trimethylolpropane, and a poly(caprolactone) having a molecular weight of from 500 to 2,000 which has itself been initiated with pentaerythritol.

27. A polymerization process according to claim 23, characterized in that the mole ratio of lactone monomer to total number of active hydrogens in the initiator system, assuming all the monomer reacts with the initiator and that each of the active hydrogens is equally reactive, is such that the theoretical molecular weight of polymer per active hydrogen is at least 25,000.

28. A polymerization process according to claim 27, characterized in that the mole ratio of lactone monomer to total number of active hydrogens in the initiator system, assuming all of the monomer reacts with the initiator and that each of the active hydrogens is equally reactive, is such that the theoretical molecular weight of polymer per active hydrogen is from 30,000 to 50,000.

29. A process of film-blowing according to claim 1 or 3, characterized in that the initiator system comprises a trifunctional initiator.

30. A polymerization process according to claim 2 or 15, characterized in that the initiator system comprises a trifunctional initiator.

31. A process of film-blowing according to claim 1 wherein said poly(lactone) comprises a poly(caprolactone) and wherein said initiator system comprises:

(a) a poly(caprolactone) having a molecular weight of from 500 to 2000 and which has itself been initiated by trimethylolpropane or pentaerythritol, and (b) cetyl alcohol and butane-1,4-diol, said poly (caprolactone) having a shear viscosity at 100° C. from 10 kPas to 20 kPas at $0.1\ s^{-1}$ shear rate and from 1 kPas to 2 kPas at $100\ s^{-1}$ shear rate.

32. A polymerization process according to claim 2 wherein said poly(lactone) comprises a poly(caprolactone) and wherein said initiator system comprises:

(a) a poly(caprolactone) having a molecular weight of from 500 to 2000 and which has itself been initiated by trimethylolpropane or pentaerythritol, and (b) cetyl alcohol and butane-1,4-diol, said poly (caprolactone) having a shear viscosity at 100° C. from 10 kPas to 20 kPas at 0.1 $s^{-1}$ shear rate and from 1 kPas to 2 kPas at 100 $s^{-1}$ shear rate.

* * * * *